United States Patent [19]

Becquey

[11] Patent Number: 5,781,502
[45] Date of Patent: Jul. 14, 1998

[54] METHOD AND DEVICE FOR FILTERING ELLIPTICAL WAVES PROPAGATING IN A MEDIUM

[75] Inventor: Marc Becquey, Rueil-Malmaison, France

[73] Assignee: Institut Francais du Petrole, Rueil-Malmaison, France

[21] Appl. No.: 685,504

[22] Filed: Jul. 24, 1996

[30] Foreign Application Priority Data

Jul. 26, 1995 [FR] France ................... 95 09197

[51] Int. Cl.$^6$ ................ G01V 1/16; G01V 1/36
[52] U.S. Cl. ................ 367/31; 367/45; 367/47; 364/421
[58] Field of Search ............ 367/30, 31, 45, 367/47; 364/421

[56] References Cited

U.S. PATENT DOCUMENTS

| | | | |
|---|---|---|---|
| 4,783,770 | 11/1988 | Danbom | 367/53 |
| 4,951,266 | 8/1990 | Hsu | 367/43 |
| 5,555,530 | 9/1996 | Meehan | 367/45 |

OTHER PUBLICATIONS

Chakrabarty et al. 64th Annu SEG Int. Mtg. Oct. 28, 1994, pp. 725–728; abst. only herewith.
Zhu et al. 1994 Int. Symp. Digest Anten. & Prop. vol. 1, IEEE. pp. 8–11; abst only herewith.

Becquey et al. 58th EAGE Conf.. Jun. 7, 1996, Paper No. B006. 2 pp.; abst only herewith.

He et al. Oil Geophys. Prosp., vol. 30, #2, pp. 257–263, Apr. 15, 1995; abst. only herewith.

*Primary Examiner*—Nelson Moskowitz
*Attorney, Agent, or Firm*—Antonelli, Terry, Stout & Kraus, LLP

[57] ABSTRACT

The present invention relates to a filtering method for discriminating elliptical waves among other waves propagating in a material medium (such as a geologic formation for example) by a combined processing of the components measured along several axes of the waves received by a multi-axis receiver. It comprises detection by at least one receiver (R) (consisting for example of one or several directional detectors such as geophones or accelerometers coupled with said formation) of the wave components in at least two orthogonal directions. A determination (by a processing assembly (1)) of the wavelet transforms of the signals is produced by this receiver (R) in response to the waves received and selection of the amplitudes of the signals resulting from this wavelet transformation is performed according to a criterion based on the ratio of the respective amplitudes thereof. The method can be used for the filtering of surface or tube waves within the scope of a seismic exploration.

16 Claims, 5 Drawing Sheets

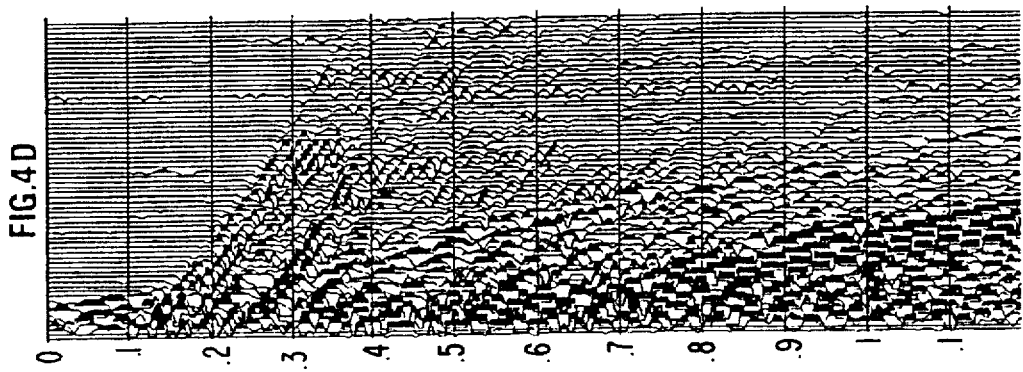
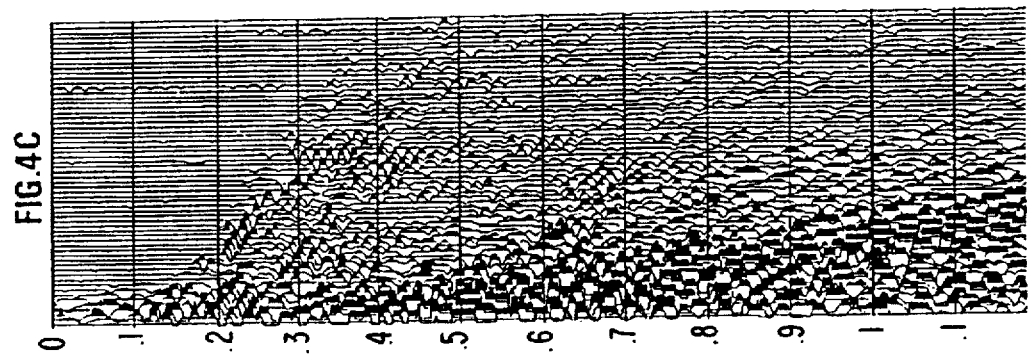
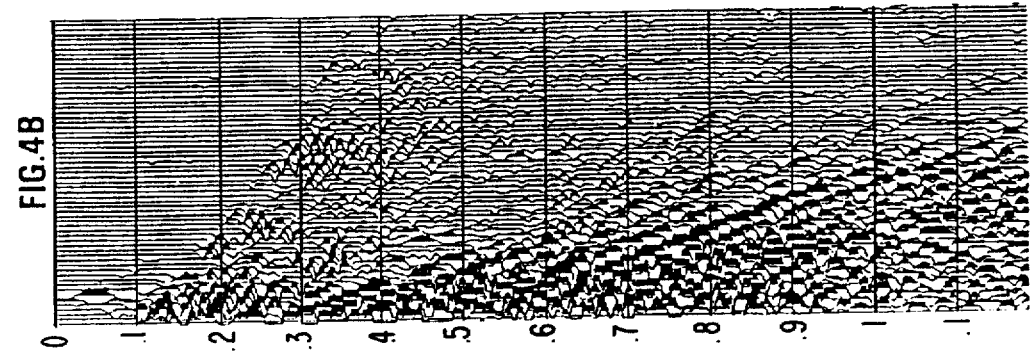
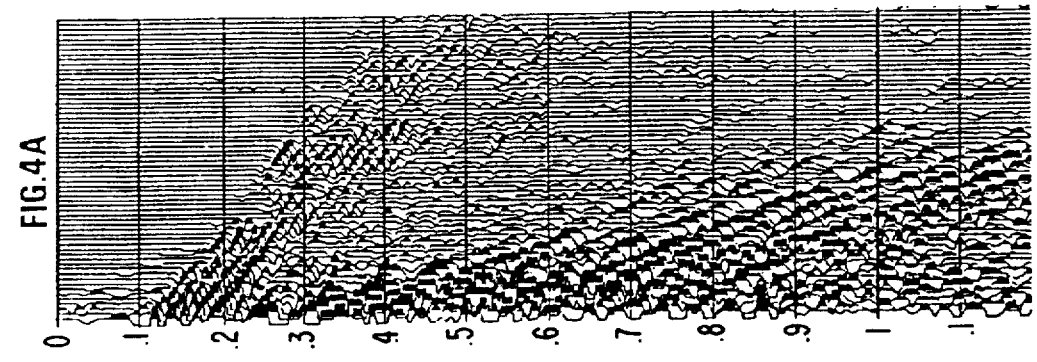

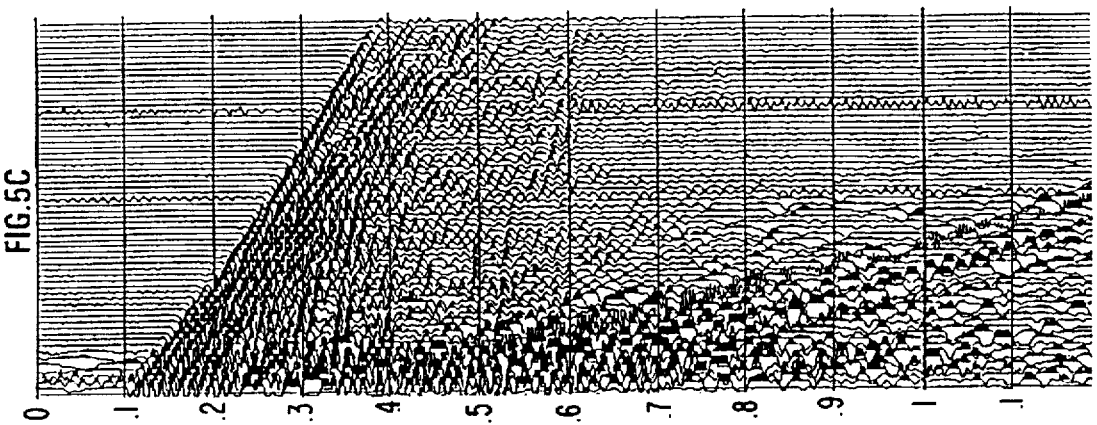
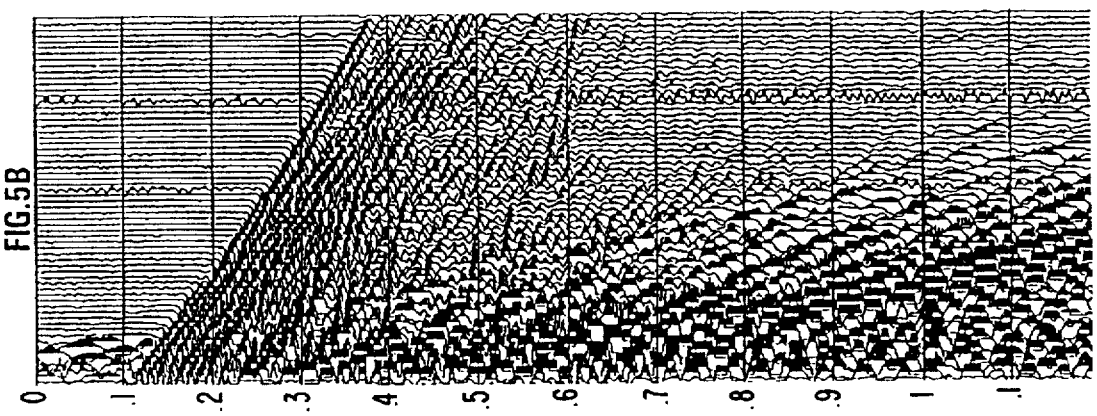
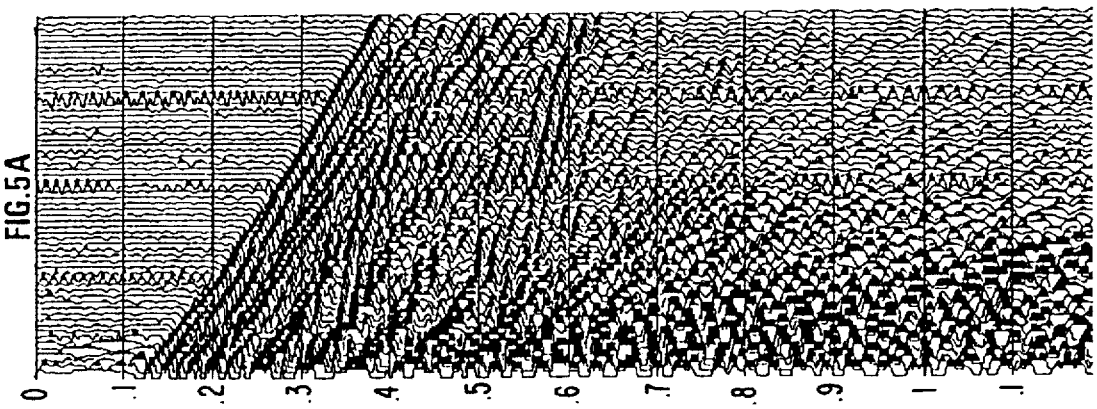

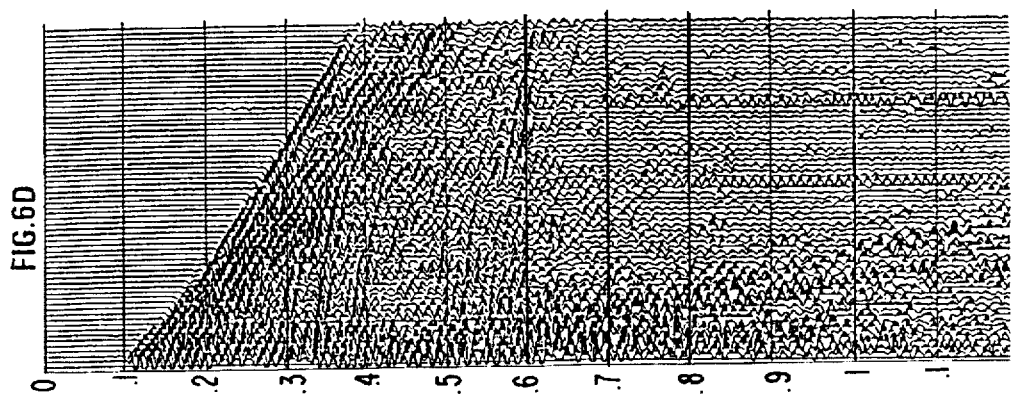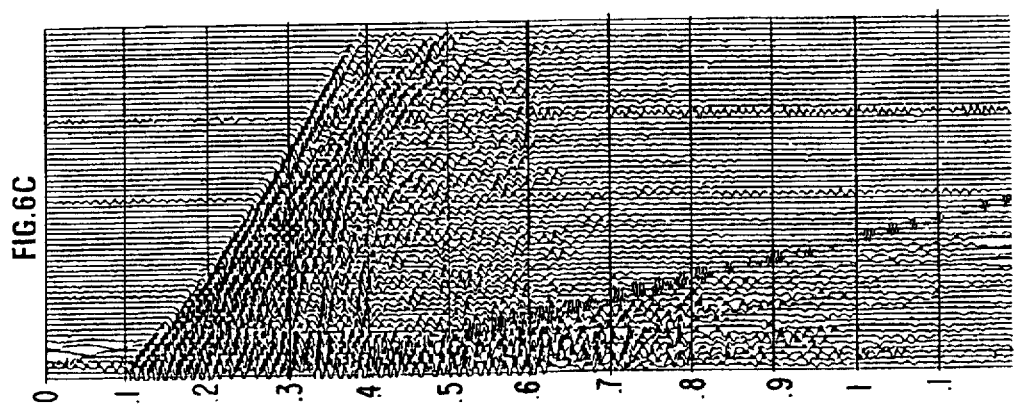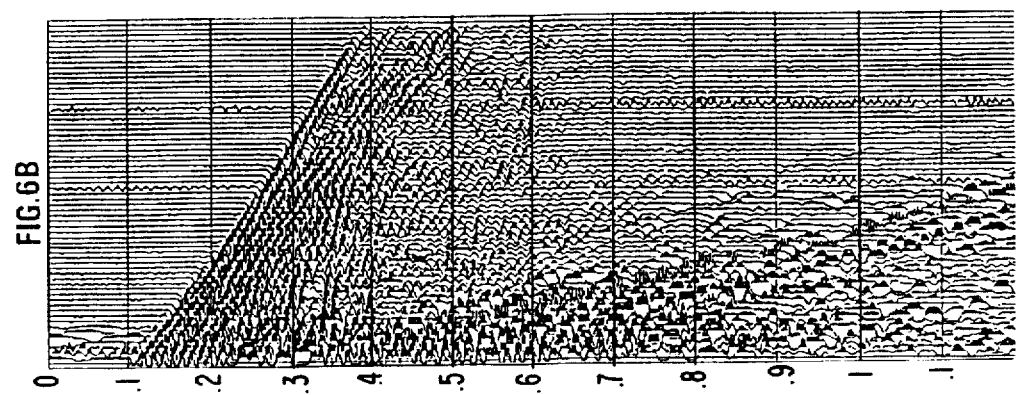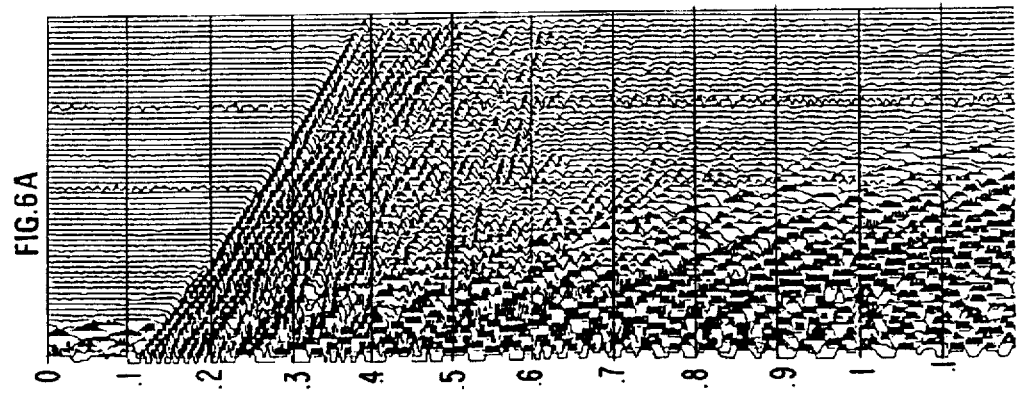

METHOD AND DEVICE FOR FILTERING ELLIPTICAL WAVES PROPAGATING IN A MEDIUM

BACKGROUND OF THE INVENTION

1. Field of the Invention

The present invention relates to a filtering method for discriminating elliptical waves among other waves propagating in a material medium by means of a combined processing of the components measured along several axes of the waves received by a multi-axis receiver.

2. Description of the Prior Art

In seismic prospecting notably, it is well known that the waves known as surface waves do not deeply penetrate. They therefore generally provide no useful information for exploration geophysicists and are considered to be noise. Their energy is often high by comparison with that of the effective signal. Surface waves must therefore be filtered.

Two types of surface waves develop along the surface of an elastic and homogeneous semi-infinite medium, the Rayleigh waves for which the motion of the particles remains in the propagation plane and the Love waves for which the motion of the particles is perpendicular to the propagation plane. The motion of the particles as the Rayleigh wave goes past follows an ellipse covered in the trigonometric (retrograde) direction; the axis of the ellipse is vertical; the ratio between the major axis and the minor axis depends on the elasticity parameters of the medium but it remains within the 1.4–1.9 range.

A geologic formation generally comprises, near the surface thereof, a low-velocity layer referred to as "weathered layer" in which develop guided waves (referred to as pseudo Rayleigh waves) formed by positive interferences for some frequencies between the reflections on the floor and the top of this low-velocity layer. These guided waves are also elliptical waves that are propagated in the vertical plane containing the source and the receiver. For some of these waves, the motion of the particles is retrograde as for the Rayleigh waves proper; for others, it is direct or prograde, i.e. clockwise. The ratio of the principal axes varies because of the thickness of the weathered layer and of the velocity contrast between this layer and the substratum. The whole formed by the Rayleigh waves and the various guided wave modes in the weathered layer is highly dispersive: the apparent velocity highly varies with the frequency and can cover a wide range. Consequently, the surface waves can cover a great part of the seismograms, thereby occuld useful information because of their high energy. All these waves are contained in the propagation plane. They are elliptical, which distinguishes them from direct and reflected waves which are, as a rule, polarized linearly. The principal axes thereof are close to the vertical and to the horizontal.

Like the body waves, the surface waves are transient. The disturbance due to each of the pseudo Rayleigh modes passes through the reception points with its specific velocity. Because of the principle of action and reaction, the time integral of the disturbance is zero; in other words, the disturbance recorded at one point is a wavelet of zero area. To sum up, Rayleigh type surface waves are:

- dominant, which allows them to be readily located when a recognition criterion is available;
- elliptical, unlike body waves, which gives the recognition criterion;
- transient, therefore their duration is limited to one or some oscillations on a trace corresponding to a reception point;
- dispersive, therefore with a limited frequency content in a time window.

More details about surface waves are available for example in the following documents:

Tolstoy, I., Usdin E., 1953, "Dispersive Properties of Stratified Elastic and Liquid Media: A Ray Theory", Geophysics, V.18, pp. 844–870; or Mooney H., Bolt B., 1966, "Dispersive Characteristics of the First Three Rayleigh Modes for a Single Surface Layer", Bull. Seism. Soc. Am., V.56, pp. 43–67.

A conventional filtering method mainly consists in using as seismic receivers "strings" of geophones interconnected in series and in stacking the respective signals thereof. To be effective, it is well-known that the filtering device consisting of one or several strings must cover a distance equal to the greatest wavelength of the surface waves or at least equal to the distance between two traces. This represents many meters of cables, a considerable space requirement and weight, and large positioning and maintenance work. This filtering type, based on the difference of the apparent horizontal velocities between the surface waves and the reflected signals, is effective only in the direction of positioning. Fabrication of an isotropic ground filter usable in 3D is too heavy to be effectively put into practice.

Another known method for filtering surface waves remaining on seismograms after using a ground filter consists for example in either muting all that was picked up by the geophones at a given point after a certain time limit, and therefore from the arrival of the surface waves (an operation known as internal mute), or in eliminating all the frequencies below a certain value by using a low-cut of filter. These filters are based on the decomposition of the records into disjointed domains and the elimination of the domains where the "noise" is encountered.

There are well-known seismic prospecting methods comprising using multi-axis seismic receivers and processing the signals along at least two orthogonal axes allowing discrimination of the surface waves.

U.S. Pat. No. 4,458,341 for example describes a seismic prospecting method comprising the reception of seismic signals coming from a formation by biaxial or triaxial pickups that may be associated with a processing assembly suited for detecting Rayleigh waves. The radial X and vertical V components of the signals picked up are applied to filtering, envelope detection and comparison circuits of this assembly which allow for determination of a reception window for the Rayleigh waves from the specific characteristics thereof, and to control the subtraction thereof from the signals received.

U.S. Pat. No. 4,935,905 also describes a seismic prospecting method where biaxial or triaxial geophones are used to receive the waves coming from a formation. The various components of the signals picked up are expressed in polar coordinates. The components of the Rayleigh waves are obtained from these components by applying a mean value method and can be subtracted.

A method for filtering surface waves by means of multi-axis geophones is also disclosed in "Expanded Abstracts", 57th EAEG Conference, Glasgow, 1995, B12.

French Patent 2,648,567 also describes a digital signal processing method applied for example to the analysis of cerebral waves, where the wavelet analysis technique is used.

Mixed time-frequency filtering:

Frequency filtering is a harmonic decomposition of the trace, followed by the elimination, in the Fourier domain, of the constituent frequencies of the surface waves (generally the lowest frequencies, up to 15 Hz, sometimes more) and the reconstitution of the signal from the saved domains. Of course, elimination of these time or frequency domains characteristic of the noise also leads to the elimination of the effective signal portion belonging to these domains. In order to limit overlaps between domains recognized from the noise, that are to be eliminated, and the rest to be saved, where it is desired to bring out the signal, it is well-known to perform two-dimensional time-frequency decompositions.

The method according to the invention uses the "time-frequency" signal analysis technique referred to as "wavelet analysis", where a signal is analyzed by means of an array of wavelets whose size varies according to a geometric progression, each wavelet being translated along the trace with a step equal to a fraction of the length thereof. This technique is for example described by:

Goupillaud P., Grossmann A., Morlet J., 1984/1985, "Cycle-Octave and Related Transforms in Seismic Signal Analysis", Geoexploration, V.23, pp. 85–102.

The analysis signal of the wavelet transform may be any signal of zero mean value. The Ricker impulse $$(a - t^2)e^{\frac{-t^2}{2a}}$$

may be used.

In the wavelet transform, the signal has a constant shape. The time-frequency decomposition by means of the wavelet transform is a discrete (sampled) operation. For a given size, the signal is shifted at a constant step at most equal to one period (cycle). The size thereof is also varied; it is expanded or compressed by changing the scale coefficient E thereof according to a constant geometric proportionality equal to 2 (at most, i.e. one octave). The sample at the time T and the scale coefficient E of the wavelet transform is the product of the trace by the wavelet of scale coefficient E, centered on the time T.

If h(t) is the base of the wavelet, b, $$h_{a,b}(t) = \frac{1}{\sqrt{a}} h\left(\frac{t-b}{a}\right)$$

wherein a is the scale coefficient or parameter and b is the time translation parameter. The wavelet transform of a signal s(t) is expressed as follows:

$$T_s(b, a) = \frac{1}{\sqrt{a}} \int_{-\infty}^{\infty} s(t) h\left(\frac{t-b}{a}\right) dt$$

The inverse transform is, to within about a coefficient, the sum of the products of each term of the wavelet transform by the corresponding wavelet.

$$s(t) = \frac{1}{\sqrt{c_g}} \int_{-\infty}^{\infty} T_s(b, a) h\left(\frac{t-b}{a}\right) \frac{da\,db}{a^2} \quad avec\, c_g =$$

$$\int \frac{\left|\int e^{-i\omega t} h(t) dt\right|^2}{|\omega|} d\omega$$

SUMMARY OF THE INVENTION

The method according to the invention allows discrimination of elliptical waves propagating on at least one propagation plane among other waves propagating in a material medium (such as a geologic formation for example). It comprises the detection, by means of at least one receiver (consisting for example of one or several directional detectors such as geophones or accelerometers coupled with said formation), of the wave components in at least two orthogonal directions.

The method according to the invention has applications in various fields. It can notably be applied to geophysical prospecting and notably to seismic prospecting operations where waves emanating from a geological formation, in response to disturbances applied thereto, are received by means of receivers coupled with the surface, such as triaxial geophones or "triphones".

The invention comprises the determination of the wavelet transforms of the signals produced by the at least one receiver in response to the waves received and a selection of the amplitudes of the wavelet transforms according to a criterion based on the ratio of the respective amplitudes thereof.

A selection window comprising the ellipticity values of the elliptical waves to be filtered is selected, a wavelet transform of the signals received in at least two orthogonal directions is performed in order to obtain a series of successive samples ($TO_n(Z)$, $TO_n(X)$) corresponding to a succession of scale factors (f) and of times (T) of a selected analysis wavelet, and the following ratios are determined:

$$r_1 = TO_n(Z)/TO_{(n-1)}(X),$$

and $$r_2 = -TO_n(Z)/TO_{(n+1)}(X)$$

where (n−1, n, n+1) represent successive serial numbers, samples for which the values $r_1$ and $r_2$ of these ratios are contained in the selection window are validated, and the field of the elliptical waves is reconstructed by performing an inverse wavelet transform. The reconstructed elliptical wave field can thereafter be optionally subtracted from the received signals.

The discrimination method of the invention can be used for example for filtering elliptical waves propagating in a geologic formation by setting one or several multi-axis receivers near the ground surface or in wells so as to filter surface waves or waves referred to as tube waves.

This discrimination method can be included in a method of seismic prospecting of an underground formation where acoustic or seismic waves are applied to the formation, waves reflected by discontinuities in the formation are received by means of one or several receivers suited for detecting each the components of the waves received in at least two different directions, the signals picked up are recorded and the signals recorded are processed in order to eliminate the elliptical waves by determining wavelet transforms of the signals produced by each receiver in response to the waves received and by selecting the amplitudes of the signals resulting from this wavelet transform according to a criterion based on the ratio of the respective amplitudes thereof.

According to an embodiment of the seismic prospecting method of the invention, the recorded signals are processed by selecting a selection window comprising the ellipticity values of the elliptical waves to be filtered, by performing a wavelet transform of the signals received in at least two orthogonal directions so as to obtain a series of successive samples TO(X), TO(Z) corresponding to a succession of scale factors (f) and of times (T) of a selected analysis wavelet, by determining the ratios:

$$r_1 = TO_n(Z)/TO_{(n-1)}(X),$$

and $$r_2 = -TO_n(Z)/TO_{(n+1)}(X)$$

where (n−1, n, n+1) represent successive serial numbers, by validating samples for which the values $r_1$ and $r_2$ of the ratios are contained in the selection window and by reconstructing the field of the elliptical waves by performing an inverse wavelet transform. The reconstructed elliptical wave field can thereafter optionally be eliminated by subtraction from the signals received.

The device according to the invention allows the discrimination of elliptical waves among acoustic or seismic waves propagating in a material medium (such as a geologic formation for example), received by at least one receiver coupled with the medium, suited for detecting wave components in at least two orthogonal directions (such as a biaxial or triaxial geophone in an application in geophysics for example).

The invention comprises a processing assembly suited for determining wavelet transforms of the signals produced by the at least one receiver in response to the waves received, and for selecting amplitudes of the signals resulting from this wavelet transform according to a criterion based on the respective amplitudes thereof.

This processing assembly comprises for example means for performing a wavelet transform of the signals received in at least two orthogonal directions (Z, X) and for obtaining a series of successive samples ($TO_n(Z)$, $TO_n(X)$) corresponding to a succession of scale factors (f) and of times (T) of a selected analysis wavelet, means for determining the ratios:

$$r_1 = TO_n(Z)/TO_{(n-1)}(X),$$

and $$r_2 = -TO_n(Z)/TO_{(n+1)}(X)$$

where (n−1, n, n+1) represent successive serial numbers, means of validation of the samples for which the values $r_1$ and $r_2$ of the ratios are contained in a selection window comprising the ellipticity values of the elliptical waves to be filtered, and means for reconstructing the elliptical wave field by performing an inverse wavelet transform. The reconstructed elliptical wave field may thereafter be optionally eliminated by subtraction from the signals received.

The invention also relates to a system of seismic prospecting in a geologic formation comprising a seismic source for generating waves in the formation, at least one receiver coupled with the formation, suited for detecting components of the waves received in at least two orthogonal directions, a control set for controlling the carrying out of seismic emission-reception cycles and for recording the signals received by each receiver.

The system comprises an elliptical wave discrimination system such as described above, which can for example be included in a local acquisition unit pre-processing the signals prior to transmitting them to a central control and recording laboratory or in a computer center.

The elliptical wave filter according to the invention performs an energetic filtering of the surface waves by using only, on each location on the ground, a single two-component receiver and a decomposition of the seismic traces into time-scale blocks. This method opens up the way for the replacement of the heavy ground reception device that is commonly used, with one or several geophone strings per trace, by single 3-component receivers at each reception point selected.

The filtering quality obtained with the method of the invention on the signals produced by triaxial receivers on the ground is higher than that conventionally obtained by stacking records of geophone strings spread over great lengths. It takes into account the real ellipticity of elliptical waves, which is very variable in reality, without making any simplifying hypothesis on the nature of the polarization thereof. Filtering of elliptical waves allows attenuation of high-velocity surface waves. Recording with a single multi-component receiver also prevents attenuation of the high frequencies due to the stacking of spaced out records.

BRIEF DESCRIPTION OF THE DRAWINGS

Other features and advantages of the method and of the device according to the invention will be clear from reading the description hereafter of embodiments given by way of non limitative examples, in a particular application to geophysics, with reference to the accompanying drawings in which:

FIGS. 4A, 4B, 4C and 4D show seismograms of a component Z filtered elliptically with disjointed ellipticity windows, respectively of (−2.2, −0.8), (−0.8, 0), (0, 0.8) and (0.8, 2.2);

FIGS. 5A, 5B, 5C respectively show a seismogram obtained with a string of 9 geophones forming a ground filter, another one obtained with a single triaxial receiver and a third one which are the result of the elliptical wave filtering according to the invention, and FIGS. 6A, 6B, 6C, 6D respectively show seismograms of an unprocessed component Z(6A), filtered elliptically (6B), after application of a wavelet time-frequency filter (6C), and after filtering of the air wave (6D).

DESCRIPTION OF THE INVENTION

The method according to the invention exploits the wavelet transform technique discussed above which is known in the art in order to detect and to discriminate elliptical waves.

After determining, to that effect, the wavelet transforms TO(X) and TO(Z) of the components X and Z, sampled at a quarter of a period (or of a cycle), the possible presence of an elliptical wave can be tested by calculating the ratio r of the nth sample of the Z transform to the (n−1)th sample of X: $r = TO_n(Z)/TO_{(n-1)}(X)$, as well as the ratio $-TO_n(Z)/TO_{(n+1)}(X)$, throughout the passage of the elliptical wave (which is dominant). It can in fact be checked that this ratio r is equal to the ellipticity a/b of this elliptical wave.

It is thereby possible to detect the presence of elliptical waves whose ellipticity is contained in a given window f, by selecting the wavelet transforms for which the value of the ratio r is contained in this window f.

Reconstruction of the seismic signals free of surface waves can then be performed by removing the time-scale blocks for which the ratios:

$$r = TO_n(Z)/TO_{(n-1)}(X)$$

or $$r = -TO_n(Z)/TO_{(n+1)}(X)$$

are contained in window f. The time-scale blocks for which the ratios r are in the determined window allow the appraising of the contribution of the surface waves. This contribution can the be subtracted from the initial seismograms.

Filter construction:

The elliptical waves are filtered as follows:

1) the wavelet transform is taken of the components X and Z of a two- or three-component record;

2) a selection window f is chosen defining the ellipticity values of the waves to be filtered;

3) for each track (i.e. for each value of the scale coefficient of the analysis wavelet) and for each time sample (i.e. for each translation of this wavelet), the ratios are calculated as follows:

$$r_1 = TO_n(Z)/TO(n-1)(X),$$

and $$r_2 = -TO_n(Z)/TO_{(n+1)}(X);$$

4) the samples are selected by validating:
   a) the samples $TO(Z)_n$ and $TO_n-1(X)_{(n-1)}$ for which $r_1$ is contained in the selection window; and
   b) the samples $TO_n(Z)$ and $TO_{(n-1)}(X)$ for which $r_2$ is contained in the selection window; and, by zeroing the non-valid samples; and 5) reconstruct the elliptical wave field is reconstructed by means of an inverse wavelet transform.

Subtracting the elliptical wave field obtained from the original seismograms is enough to obtain seismograms free of elliptical waves.

Figure 1:
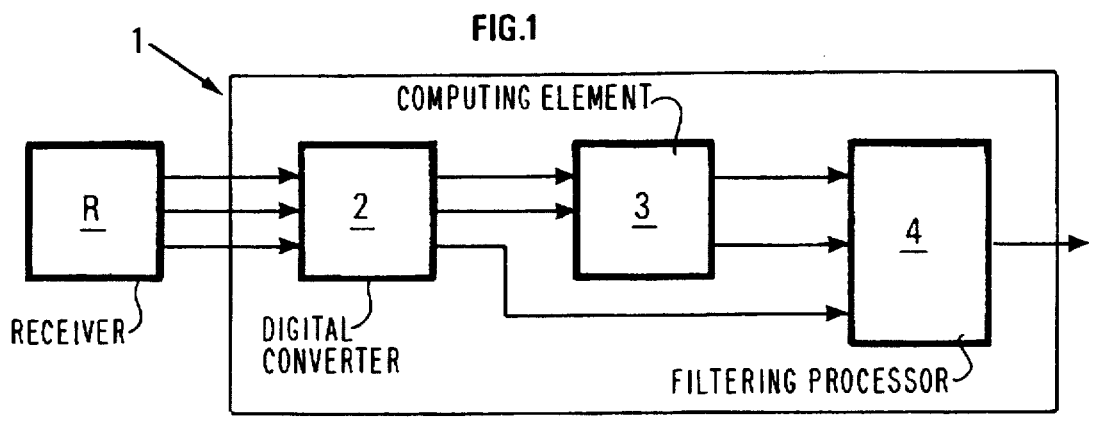
FIG. 1 diagrammatically shows an embodiment of the device designed to implement the method of the invention placed on the ground in the neighborhood of the locating place of a receiver.
Figure 2:
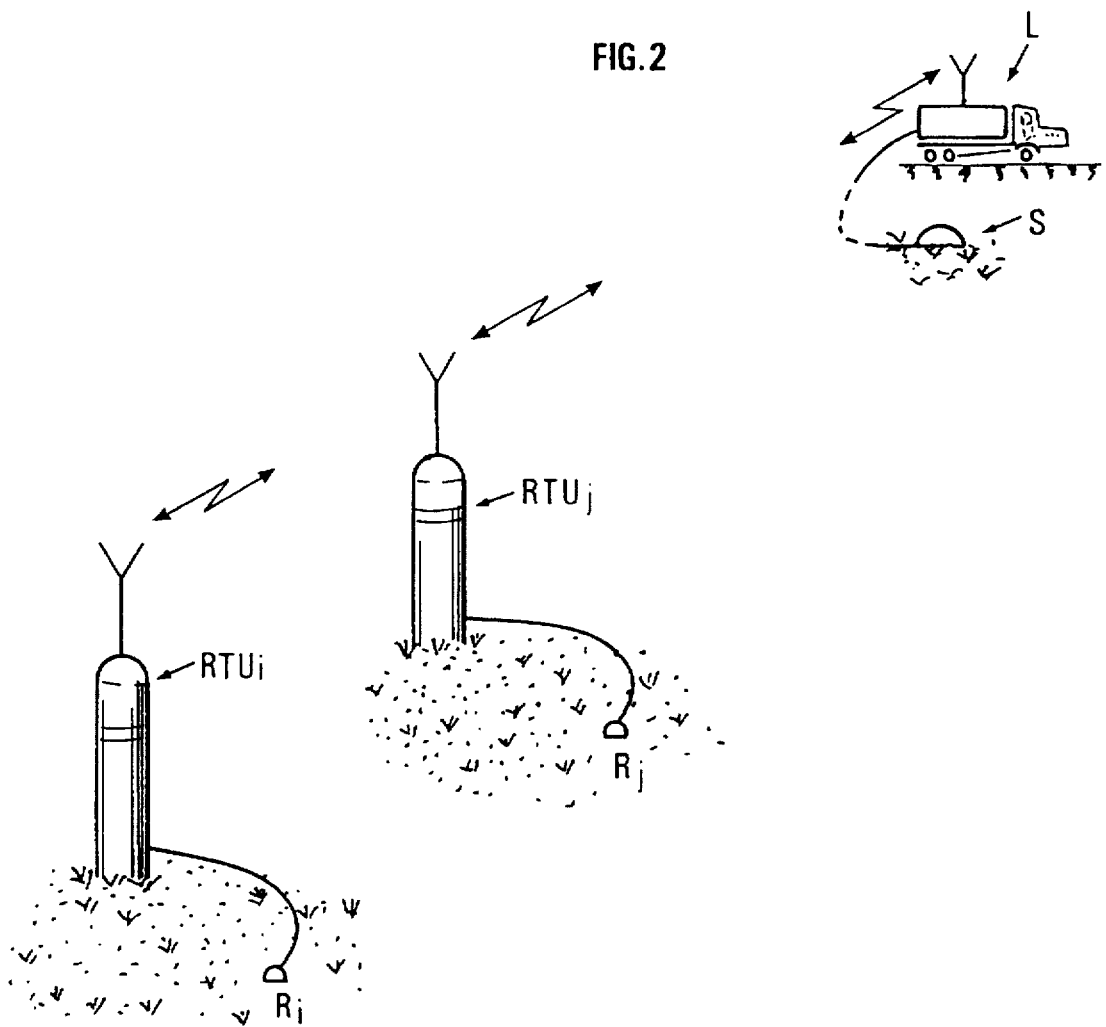
FIG. 2 diagrammatically shows another embodiment where the device designed to implement the method of the invention is included in an acquisition box for pre-processing the signals received.
Figure 3C:
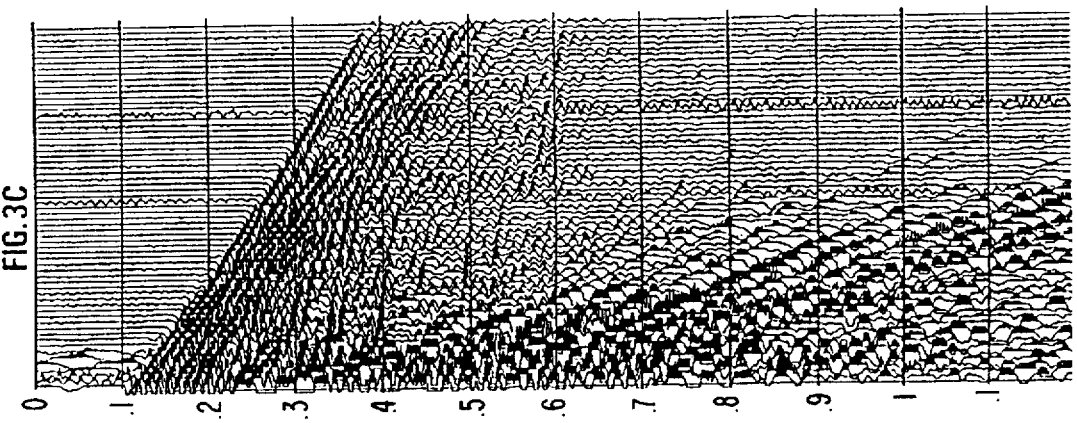
FIGS. 3A, 3B, 3C respectively show an original seismogram, another showing the elliptical waves and a third one obtained by calculating the difference between the previous two seismograms.
Figure 3B:
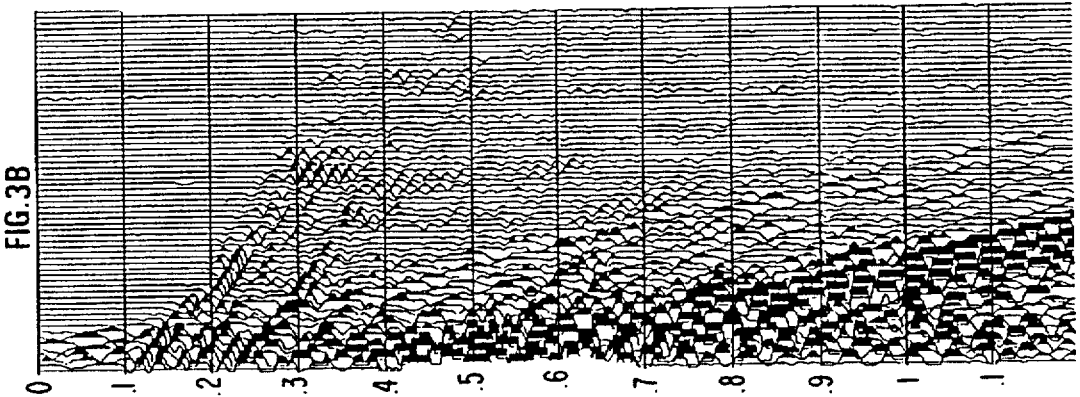
Figure 3A:
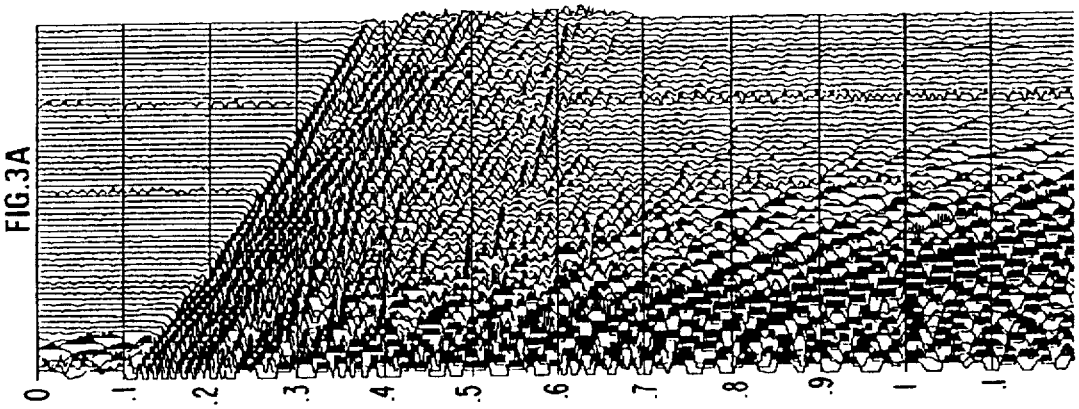

The device for implementing the method is associated in combination with at least one multi-component acoustic or seismic wave receiver R (FIGS. 1, 2). This receiver R includes at least two pickups whose axes are oriented in two orthogonal directions preferably selected in connection with a plane of polarization of the elliptical waves to be detected. In seismic prospecting for example, a triaxial receiver of which one of the axes is placed in the plane containing the seismic source and the receiver coupling location is typically used. The device comprises a processing assembly 1 including an analog-to-digital converter 2 for sampling and digitizing the various signals produced by receiver R. In order to take into account of a possible azimuth deviation of the plane containing the axis of the vertical pickup and that of one of the horizontal pickups with respect to the vertical reference plane containing the location of the seismic source used and the location of receiver R, processing assembly 1 includes a computing element 3 for calculating the coordinates X, Z in this reference plane, and a filtering processor 4 for discriminating the elliptical waves among the waves received and optionally for eliminating them, according to the algorithm defined above. In practice, a programmed computer 4 is preferably used to perform notably the discrimination algorithm stages.

In order to fulfill all the functions of acquisition and of processing of the signals produced by each receiver R, according to the method, a local acquisition unit RTU (FIG. 2) such as those described in the Assignee's French patent applications EN.94/06.514 and 2,692,384 can be advantageously used. Each local unit RTUi, RTUj (FIG. 2) is placed in the neighborhood of and connected to at least one ground seismic receiver Ri, Rj. In addition to a management processor, each of these local units RTU includes a complementary computing processor (of the DSP type) programmed to carry out real-time extended functions: processing of data prior to the transmission thereof, such as various seismic signal combinations, data compression, real-time quality controls during the stage of deployment of the seismic equipment (seismic receivers and electronic devices, etc). Each local unit RTU acquires and pre-processes the seismic data received from the formation in response to seismic waves transmitted in the ground by a seismic source S, prior to transmitting them to a central control and recording laboratory L through cables or a radio connection.

Additional processing programs suitable for implementing the method according to the invention may in this case be included in such ground units that are, in such circumstances, connected to at least one multi-axis receiver R.

The processing assembly may also comprise an interposed high-pass filter (not shown).

It is also possible to record at least two of the three components of each receiver and to achieve filtering after acquisition on the ground, either in the central ground laboratory or in a computing center.

Experimental validation:

Seismic recordings were performed with a seismic equipment comprising:
- alternatively a conventional geophone string with 9 interconnected geophones or a single triaxial seismic receiver with 3C,
- a weight-drop seismic source, and
- a 2-millisecond step acquisition and recording assembly.

Application examples of elliptical wave filtering:

FIGS. 3–7 show the results of the reconstruction, by means of inverse transformation of the wavelet transform, of the seismogram by applying the method according to the invention. The transform is sampled at a quarter of a period in time. The scale half-octave sampling gives a satisfactory reconstruction for a quarter of a base cycle of 24 ms and an analysis signal compression on 2.5 octaves. For a good reconstruction, it is preferable that the sampling interval is at most equal to one eighth of the period of the narrowest signal.

Elliptical wave estimation:

The frequency band comprising the surface waves is more limited than that of the effective signal. These waves can therefore be estimated on a limited number of octaves and the elliptical wave estimation can be subtracted from the initial sismogram.

Just as a frequency analysis is carried out by filter juxtaposition in different frequency bands, an ellipticity analysis can be performed by filtering a seismogram with disjointed ellipticity windows. Analysis shows (FIGS. 4A to 4D) that the arrivals at 570 m/s have an "ellipticity" mainly ranging between (−0.8 and 2.2). The negative values mean that these elliptical waves cause a clockwise or prograde motion of the particles. These are M2 waves or waves known as Sesawa waves. The major axis of the ellipses described is on the horizontal. These disjointed filters allow the analysis of ellipticity characters of the various waves recorded and to specify the nature thereof.

Comparison with a ground filter:

In FIGS. 5A to 5C, where the records obtained with a geophone string, the component Z of the single 3-C pickup and the signal from the elliptical wave filter are juxtaposed, it can be seen for example that the pseudo Rayleigh waves at 570 m/s are not filtered by the geophone string, which is too short. This is also the case for surface waves at 2200 m/s. The elliptical wave filter is more effective in these domains. Besides, the frequency content of the reflected field appears much wider in the filtered seismogram obtained from the single 3-C pickup. In the filtered seismogram 5C, a low-velocity wave remains, whose polarization is practically linear.

This wave has a rather constant pseudoperiod and it can be readily removed by a wavelet time-frequency filter.

The air wave shown by the high-frequency event visible in FIGS. 6A to 6D gives the measure of the attenuation achieved by the elliptical wave filter used. In FIG. 6D, this air wave has been filtered by a low-pass frequency filter.

It thus appears, as confirmed by the examples above, that the elliptical surface waves, Rayleigh waves and pseudo Rayleigh waves can be filtered by an elliptical wave filter if records in the source-receiver direction and on the vertical are available.

The results of the wavelet filtering method on the signals produced by triaxial receivers 3 on the ground are better than those conventionally obtained by stacking records performed by 9 geophones spread over 20 meters. The elliptical wave filter allows attenuation of the high-velocity surface waves and recording on a single pickup allows to prevent attenuation of the high frequencies due to the stacking of spaced out records.

Within the scope of geophysics applications, the method according to the invention can be used for example to discriminate waves of an elliptical character in relation to other waves, for example rectilinear polarization waves or even other elliptical waves, so as to discriminate them in relation to one another. Such elliptical waves may be surface waves or tube waves.

Implementation modes applied to the processing of geophysical data have been described. The elliptical wave discrimination and filtering method according to the invention may of course used in other fields of application and on other wave types than acoustic or seismic waves, notably on electric, electrophysiological signals, etc.

I claim:

1. A method for discriminating a field of elliptical waves with an eccentricity in a determined window, the elliptical waves propagating in at least one propagation plane, in a material medium, and being received by at least one receiver providing signals corresponding to wave components in at least two orthogonal directions forming a plane, the method comprising:

determining for each wave component wavelet transforms of the signals corresponding to the wave components to form a series of samples corresponding to different scale factors and times of an analysis wavelet; and selecting samples in each series by forming ratios of sample amplitudes of the series of samples shifted with respect to one another according to a criterion depending on the determined window.

2. A method for discriminating elliptical waves with an eccentricity in a determined window, the elliptical waves propagating in at least one propagation plane, in a material medium, and being received by at least one receiver providing signals corresponding to wave components in at least two orthogonal directions (X,Z) forming a plane, the method comprising:

forming a wavelet transform (TO(X), TO(Z)) of the signals received in the at least two orthogonal directions (Z,X) to obtain a series of successive samples corresponding to a succession of scale factors (f) and of times (T) of a selected analysis wavelet;

determining ratios $r_1 = TO_n(Z)/TO_{(n-1)}(X)$ and $r_2 = -TO_n(Z)/TO_{(n+1)}(X)$ between shifted samples, with (n−1, n, n+1) being successive serial numbers;

selecting samples for which the values $r_1$ and $r_2$ of the ratios are in the determined window; and reconstructing an elliptical wave field by performing an inverse wavelet transform.

3. A method as claimed in claim 2, wherein the at least one receiver includes a plurality of directional sensors which are geophones or accelerometers coupled with the formation.

4. A method as claimed in claim 3, wherein the at least one receiver includes a plurality of directional sensors which are geophones or accelerometers coupled with the formation.

5. A method as claimed in claim 2 wherein the at least one receiver includes a plurality of directional sensors which are geophones or accelerometers coupled with the at least one receiver being set near a ground surface to filter elliptical surface waves.

6. A method as claimed in claim 3 wherein the at least one receiver includes a plurality of directional sensors which are geophones or accelerometers coupled with the at least one receiver being set near a ground surface to filter elliptical surface waves.

7. A method as claimed in claim 3, wherein the at least one receiver includes a plurality of directional sensors which are geophones or accelerometers coupled with the at least one receiver being set in at least one well through the formation for filtering elliptical waves propagating along the at least one well.

8. A method as claimed in claim 1 further comprising subtracting the reconstructed elliptical wave field from signals received by the at least one receiver.

9. A method as claimed in claim 2 further comprising subtracting the reconstructed elliptical wave field from signals received by the at least one receiver.

10. A method of seismic prospecting of an underground formation, comprising:

applying acoustic or seismic waves to the formation, receiving elliptical waves reflected by discontinuities in the formation by at least one receiver which detects components of the waves received in at least two different directions, recording signals picked up by the at least one receiver in response to the received waves, discriminating in the received elliptical waves with an eccentricity in a determined window, propagating in at least one propagation plane, by determining for each wave component wavelet transforms of the corresponding signals to form a series of samples corresponding to different scale factors and times of an analysis wavelet and selecting samples in each series by forming ratios of sample amplitudes of the series of samples shifted with respect to one another according to a criterion depending on the determined window.

11. A method of seismic prospecting of an underground formation, comprising:

applying acoustic or seismic waves to the formation, receiving elliptical waves reflected by discontinuities in the formation by at least one receiver which detects components of the waves received in at least two different orthogonal directions (X,Z), recording signals picked up by the at least one receiver in the at least two orthogonal directions in response to the received waves;

discriminating in the received elliptical waves with an eccentricity in a determined window, propagating in at least one propagation plane formed by the two different orthogonal directions, by determining for each wave component wavelet transforms (TO(X), TO(Z)) of corresponding signals to form a series of samples corresponding to different scale factors and times of an analysis wavelet;

determining ratios $r_1=(TO_n(Z)/TO_{(n-1)}(X)$ and $r_2=-TO_n(Z)/TO_{(n+1)}(X)$ between shifted samples with (n−1, n, n+1) being successive serial numbers;

selecting samples for which values of $r_1$ and $r_2$ of the ratios is in the determined window; and reconstructing an elliptical wave field by performing an inverse wavelet transform.

12. A seismic prospecting method as claimed in claim 11 further comprising subtracting the reconstructed elliptical wave field from the received elliptical waves.

13. A device for discriminating elliptical waves propagating on at least one propagation plane among acoustic or seismic waves propagating in a material medium, received by at least one receiver coupled with the medium which detects wave components in a least two orthogonal directions, comprising:

a processing assembly for determining for each wave component wavelet transforms of corresponding signals to form a series of samples corresponding to different scale factors and times of an analysis wavelet and selecting samples in each series of samples by forming ratios of sample amplitudes of each different series of samples shifted with respect to one another according to a criterion depending on a determined window.

14. A discrimination device as claimed in claim 13, wherein the processing assembly includes means for determining for each wave component wavelet transforms (TO(X), TO(Z)) of the corresponding signals to form a series of samples corresponding to different scale factors and times of an analysis wavelet, means for determining ratios $r_1=TO_n(Z)/TO_{(n-1)}(X)$ and $r_2=-TO_n(Z)/TO_{(n+1)}(X)$ between shifted samples with (n−1, n, n+1) being successive serial numbers, means for selecting samples for which values $r_1$ and $r_2$ of the ratios is in the determined window, and means for reconstructing an elliptical wave field by performing an inverse wavelet transform.

15. A discrimination device as claimed in claim 13 further comprising means for subtracting the reconstructed elliptical wave field from the received elliptical waves.

16. A discrimination device as claimed in claim 14 further comprising means for subtracting the reconstructed elliptical wave field from the received elliptical waves.

* * * * *